US012757052B2

(12) United States Patent
Kiran et al.

(10) Patent No.: US 12,757,052 B2
(45) Date of Patent: Oct. 6, 2026

(54) CROSS-LINK INTERFERENCE (CLI) MEASUREMENT AND REPORTING

(71) Applicant: MediaTek Singapore Pte. Ltd., Singapore (SG)

(72) Inventors: Rama Kiran, Bengaluru KA (IN); Chandrasekaran Mohandoss, Bengaluru KA (IN); Jinesh Parameshwaran Nair, Bengaluru KA (IN); Chien-Hua Chen, Hsinchu (TW); Yih-Shen Chen, Hsinchu (TW)

(73) Assignee: MediaTek Singapore Pte. Ltd., Singapore (SG)

( * ) Notice: Subject to any disclaimer, the term of this patent is extended or adjusted under 35 U.S.C. 154(b) by 358 days.

(21) Appl. No.: 18/544,603

(22) Filed: Dec. 19, 2023

(65) Prior Publication Data

US 2024/0214852 A1 Jun. 27, 2024

(30) Foreign Application Priority Data

Dec. 22, 2022 (IN) ............................. 202221074547

(51) Int. Cl.
*H04W 24/10* (2009.01)
*H04L 5/14* (2006.01)

(52) U.S. Cl.
CPC ............... *H04W 24/10* (2013.01); *H04L 5/14* (2013.01)

(58) Field of Classification Search
CPC ................................ H04W 24/10; H04L 5/14
See application file for complete search history.

(56) References Cited

U.S. PATENT DOCUMENTS

| | | | | |
|---|---|---|---|---|
| 12,490,156 | B2 * | 12/2025 | Zhang | H04W 36/0061 |
| 2020/0344614 | A1 * | 10/2020 | Takano | H04B 17/345 |
| 2021/0006438 | A1 * | 1/2021 | Harrebek | H04W 24/10 |
| 2022/0094410 | A1 | 3/2022 | Li et al. | |
| 2022/0312232 | A1 * | 9/2022 | Nam | H04W 24/08 |
| 2023/0163868 | A1 * | 5/2023 | Zhang | H04B 17/24 370/252 |
| 2023/0232264 | A1 * | 7/2023 | Ren | H04L 5/0051 370/329 |
| 2023/0328782 | A1 * | 10/2023 | Zhang | H04L 5/0094 |
| 2023/0388837 | A1 * | 11/2023 | Ibrahim | H04L 5/0005 |
| 2024/0163058 | A1 * | 5/2024 | Taghizadeh Motlagh | H04L 5/0051 |

(Continued)

FOREIGN PATENT DOCUMENTS

WO 2022056822 A1 3/2022

OTHER PUBLICATIONS

European Search Report, May 23, 2024, Germany.

(Continued)

*Primary Examiner* — Mounir Moutaouakil
(74) *Attorney, Agent, or Firm* — Troutman Pepper Locke LLP; Tim Tingkang Xia, Esq.

(57) ABSTRACT

In an aspect of the disclosure, a method, a computer-readable medium, and an apparatus are provided. The apparatus is a UE. The UE receives, from a base station, a measurement configuration for measuring cross-link interference (CLI) in a subband full-duplexing (SBFD) slot and a reporting configuration for reporting the CLI. The UE performs measurements of the CLI on measurement resources indicated by the measurement configuration. The UE reports an indication of the measured CLI to the base station according to the reporting configuration.

19 Claims, 12 Drawing Sheets

(56) References Cited

U.S. PATENT DOCUMENTS

| | | | | |
|---|---|---|---|---|
| 2024/0283552 | A1* | 8/2024 | Mahama ............... | H04W 24/08 |
| 2024/0298198 | A1* | 9/2024 | Ibrahim ................ | H04W 24/10 |

OTHER PUBLICATIONS

3GPP TSG RAN WG1, Meeting #111, R1-2212116 Toulouse, France, Nov. 14-18, 2022, Agenda 9.3.3, Qualcomm Incorporated, On potential enhancements on dynamic/flexible TDD, Discussion/Decision.

* cited by examiner

1100

CLI Report Settings 1110

| CLI Report Type | CLI Threshold | CLI Report Resolution | CLI Report |
|---|---|---|---|
| 0 | $CLI_{threshold}$ | | 0 if *Inter_UE CLI* <= $CLI_{threshold}$ |
| | | | 1 if *Inter_UE CLI* > $CLI_{threshold}$ |
| 1 | | $CLI_{resolution}$ | *Inter_UE CLI* |

FIG. 11

CROSS-LINK INTERFERENCE (CLI) MEASUREMENT AND REPORTING

This application claims priority of Indian Patent Application Serial No. 202221074547, entitled "METHODS FOR INTER-UE CROSS LINK INTERFERENCE MEASUREMENT AND REPORTING FOR FULL DUPLEX SYSTEM" and filed on Dec. 22, 2022, which is expressly incorporated by reference herein in its entirety.

BACKGROUND

Field

The present disclosure relates generally to communication systems, and more particularly, to techniques of CLI measurement and reporting.

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus is a UE. The UE receives, from a base station, a measurement configuration for measuring cross-link interference (CLI) in a subband full-duplexing (SBFD) slot and a reporting configuration for reporting the CLI. The UE performs measurements of the CLI on measurement resources indicated by the measurement configuration. The UE reports an indication of the measured CLI to the base station according to the reporting configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11 is a diagram illustrating report setting for CLI measurement.

DETAILED DESCRIPTION

Figure 1:
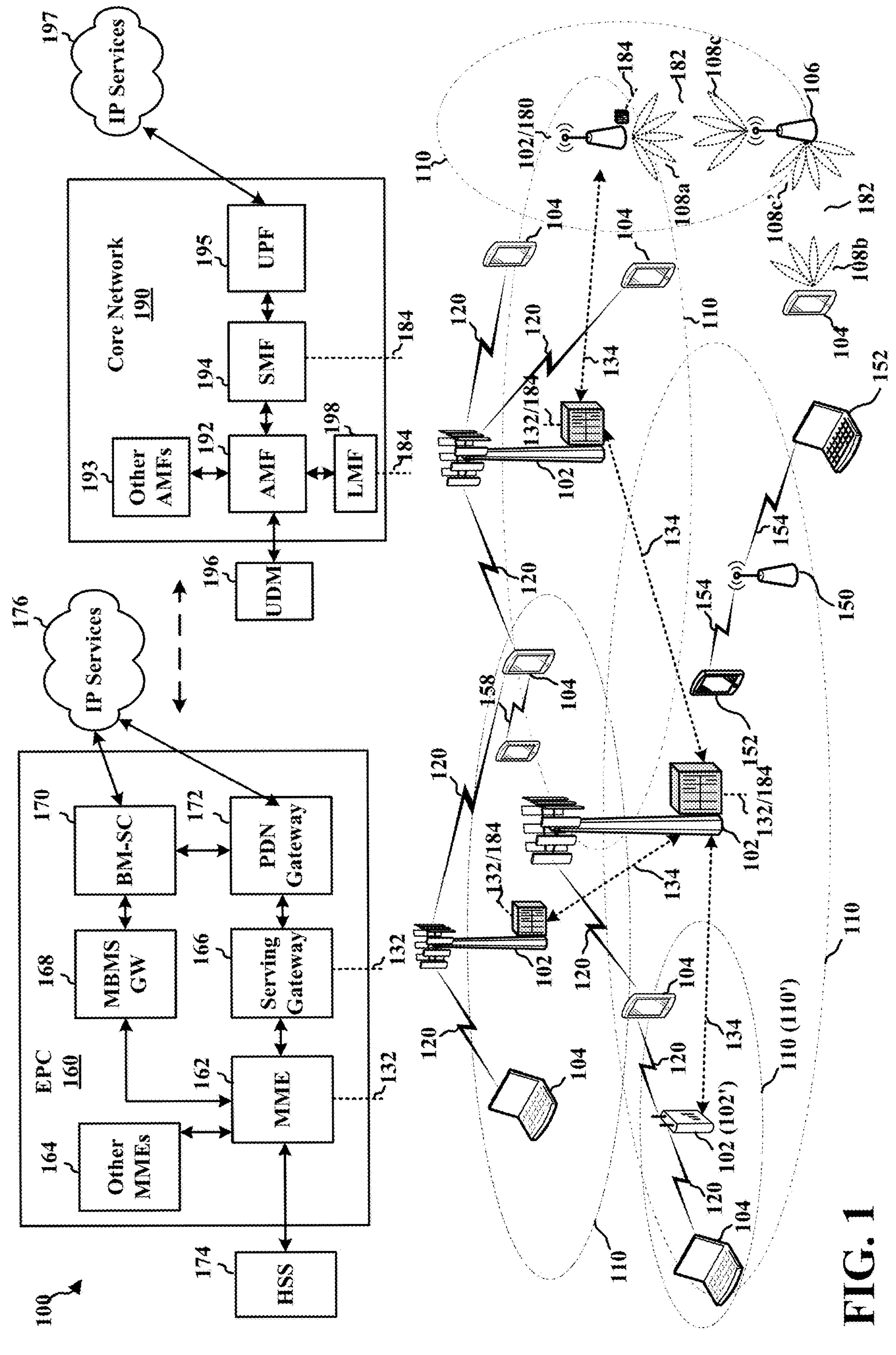
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunications systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., SI interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to 7 MHZ (e.g., 5, 10, 15, 20, 100, 400, etc. MHz) bandwidth per carrier allocated in a carrier aggregation of up to a total of Yx MHZ (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ. WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102" may employ NR and use the same 5 GHZ unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHZ with a wavelength of 100 millimeters. The super high frequency (SHF) band extends between 3 GHZ and 30 GHZ, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 108*a*. The UE 104 may receive the beamformed signal from the base station 180 in one or more receive directions 108*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a location management function (LMF) 198, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the SMF 194 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the present disclosure may reference 5G New Radio (NR), the present disclosure may be applicable to other similar areas, such as LTE, LTE-Advanced (LTE-A), Code Division Multiple Access (CDMA), Global System for Mobile communications (GSM), or other wireless/radio access technologies.

Figure 2:
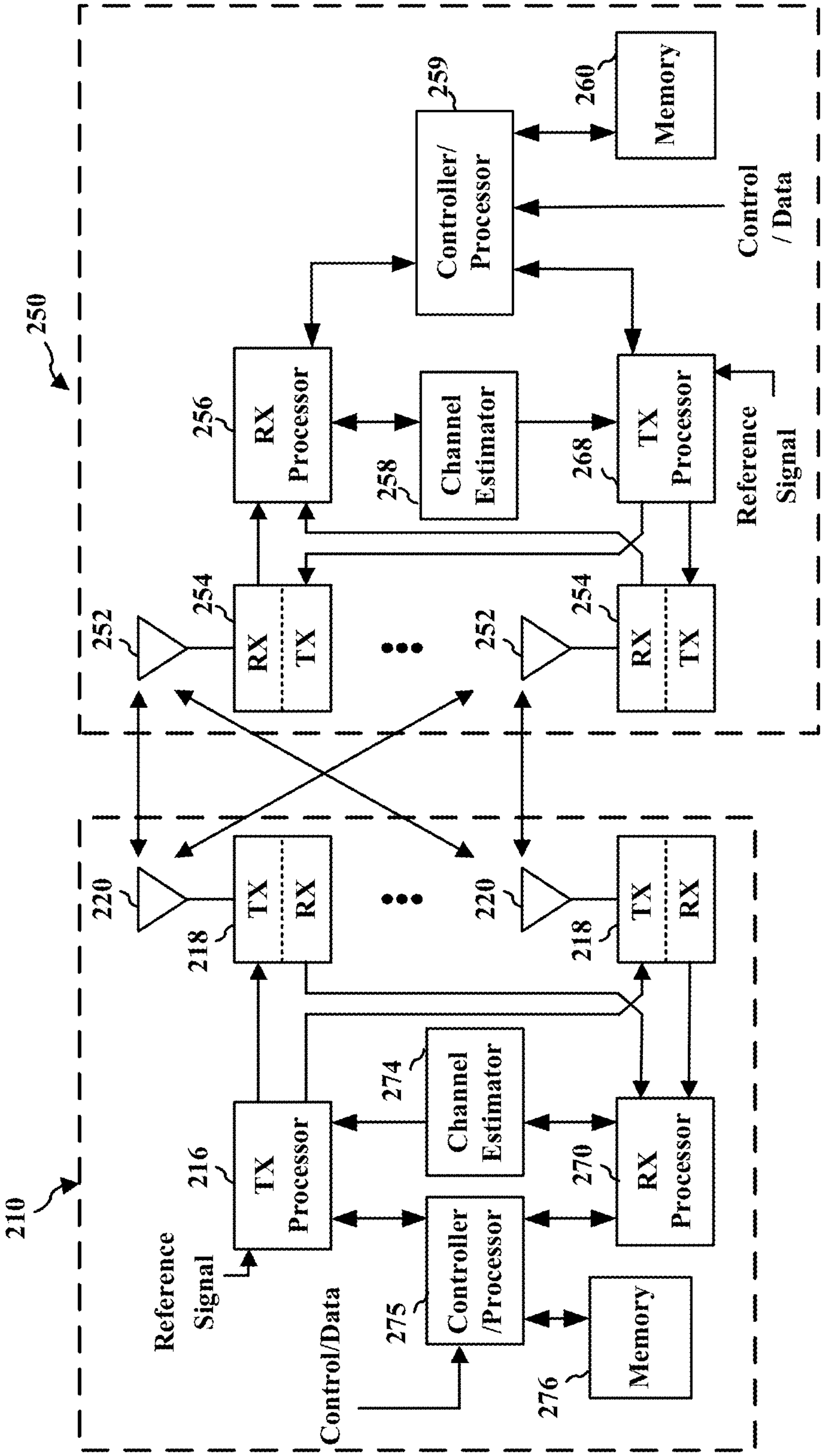
FIG. 2 is a diagram illustrating a base station in communication with a UE in an access network.

FIG. 2 is a block diagram of a base station 210 in communication with a UE 250 in an access network. In the DL, IP packets from the EPC 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging. RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the EPC 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the EPC 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHZ), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.25 ms duration or a bandwidth of 30 kHz over a 0.5 ms duration (similarly, 50 MHz BW for 15 kHz SCS over a 1 ms duration). Each radio frame may consist of 10 subframes (10, 20, 40 or 80 NR slots) with a length of 10 ms. Each slot may indicate a link direction (i.e., DL or UL) for data transmission and the link direction for each slot may be dynamically switched. Each slot may include DL/UL data as well as DL/UL control data. UL and DL slots for NR may be as described in more detail below with respect to FIGS. 5 and 6.

The NR RAN may include a central unit (CU) and distributed units (DUS). A NR BS (e.g., gNB, 5G Node B. Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
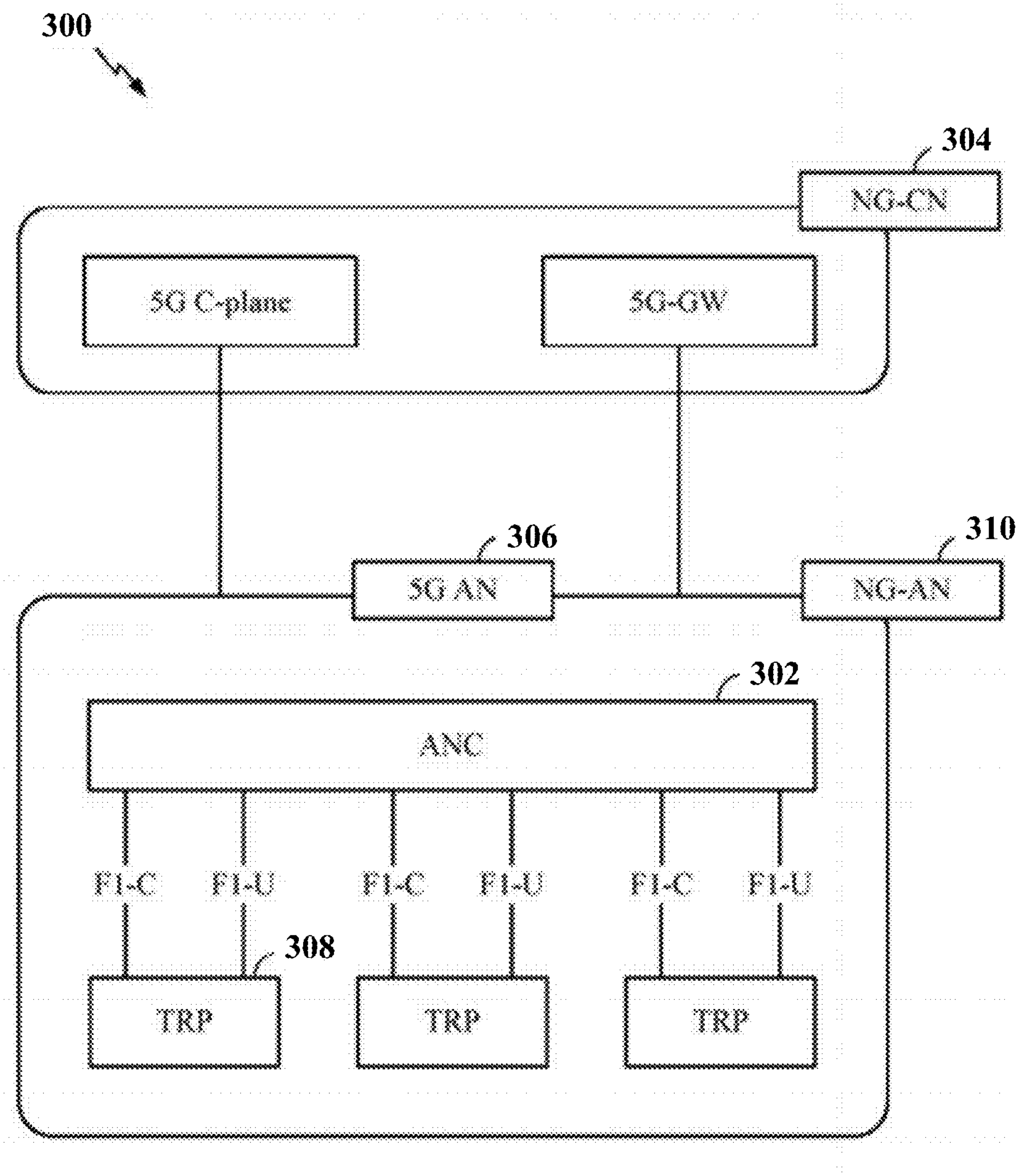
FIG. 3 illustrates an example logical architecture of a distributed access network.

FIG. 3 illustrates an example logical architecture of a distributed RAN 300, according to aspects of the present disclosure. A 5G access node 306 may include an access node controller (ANC) 302. The ANC may be a central unit (CU) of the distributed RAN. The backhaul interface to the next generation core network (NG-CN) 304 may terminate at the ANC. The backhaul interface to neighboring next generation access nodes (NG-ANs) 310 may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
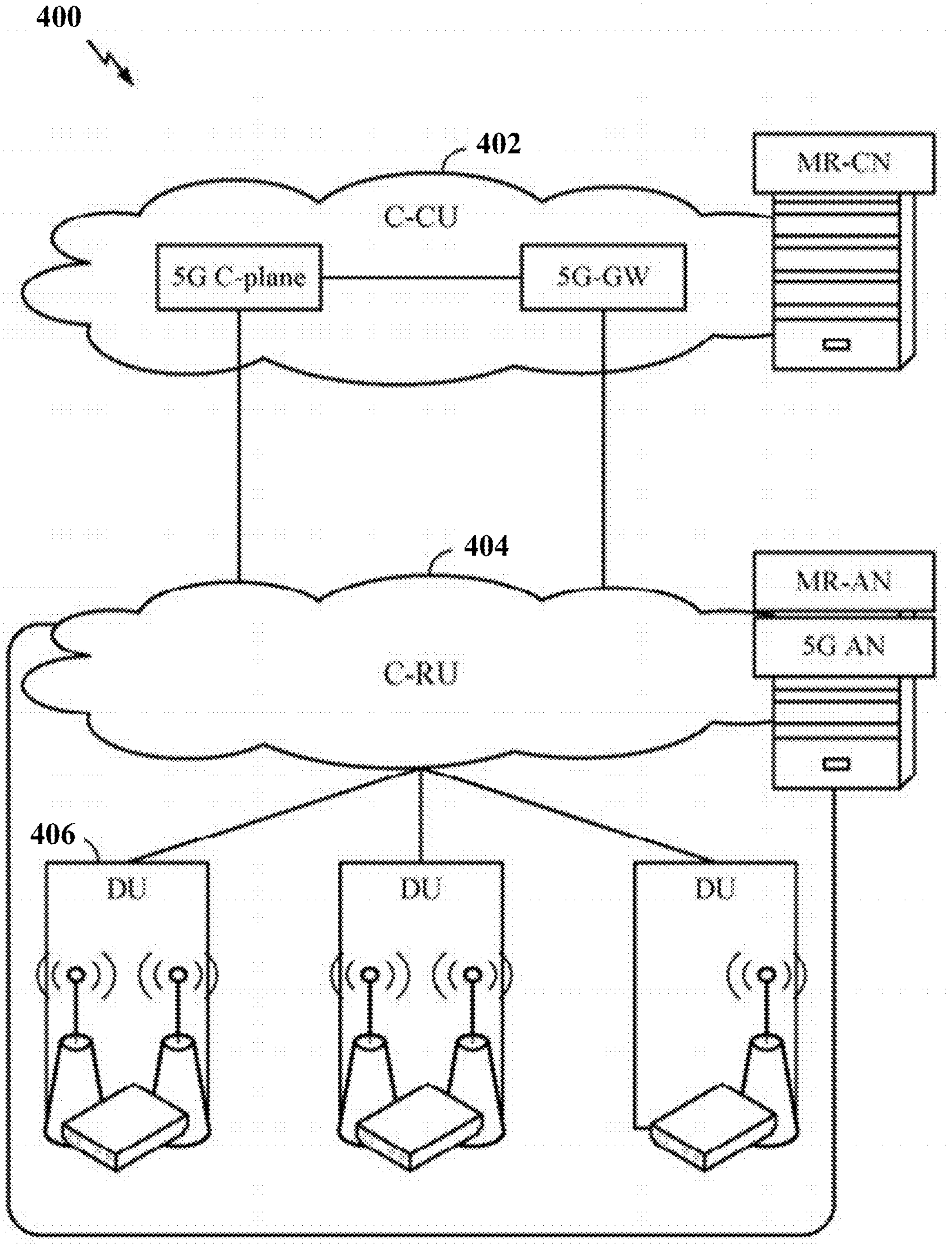
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
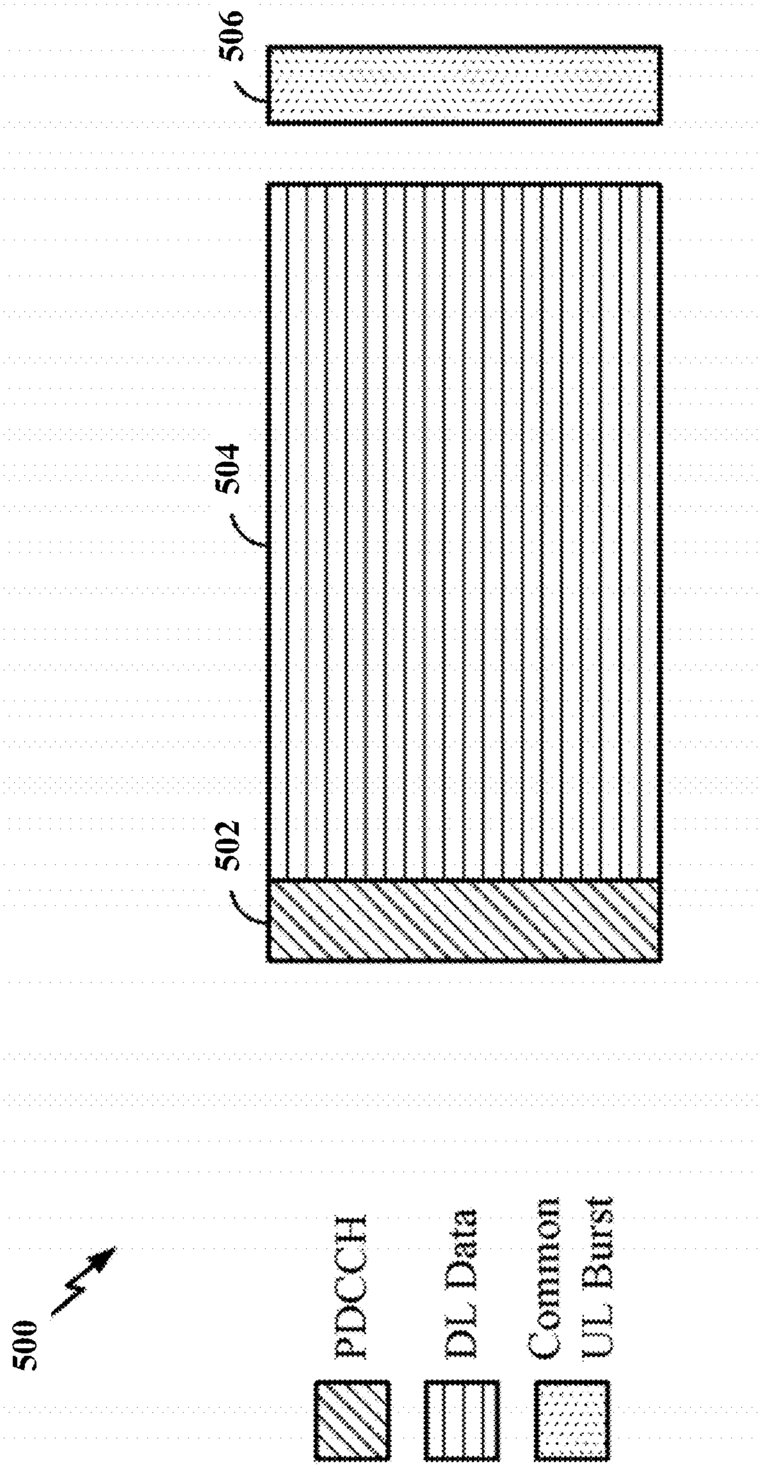
FIG. 5 is a diagram showing an example of a DL-centric slot.

FIG. 5 is a diagram 500 showing an example of a DL-centric slot. The DL-centric slot may include a control portion 502. The control portion 502 may exist in the initial or beginning portion of the DL-centric slot. The control portion 502 may include various scheduling information and/or control information corresponding to various portions of the DL-centric slot. In some configurations, the control portion 502 may be a physical DL control channel (PDCCH), as indicated in FIG. 5. The DL-centric slot may also include a DL data portion 504. The DL data portion 504 may sometimes be referred to as the payload of the DL-centric slot. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric slot may also include a common UL portion 506. The common UL portion 506 may sometimes be referred to as an UL burst, a common UL burst, and/or various other suitable terms. The common UL portion 506 may include feedback information corresponding to various other portions of the DL-centric slot. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric slot and alternative structures having similar features may exist without necessarily deviating from the aspects described herein.

Figure 6:
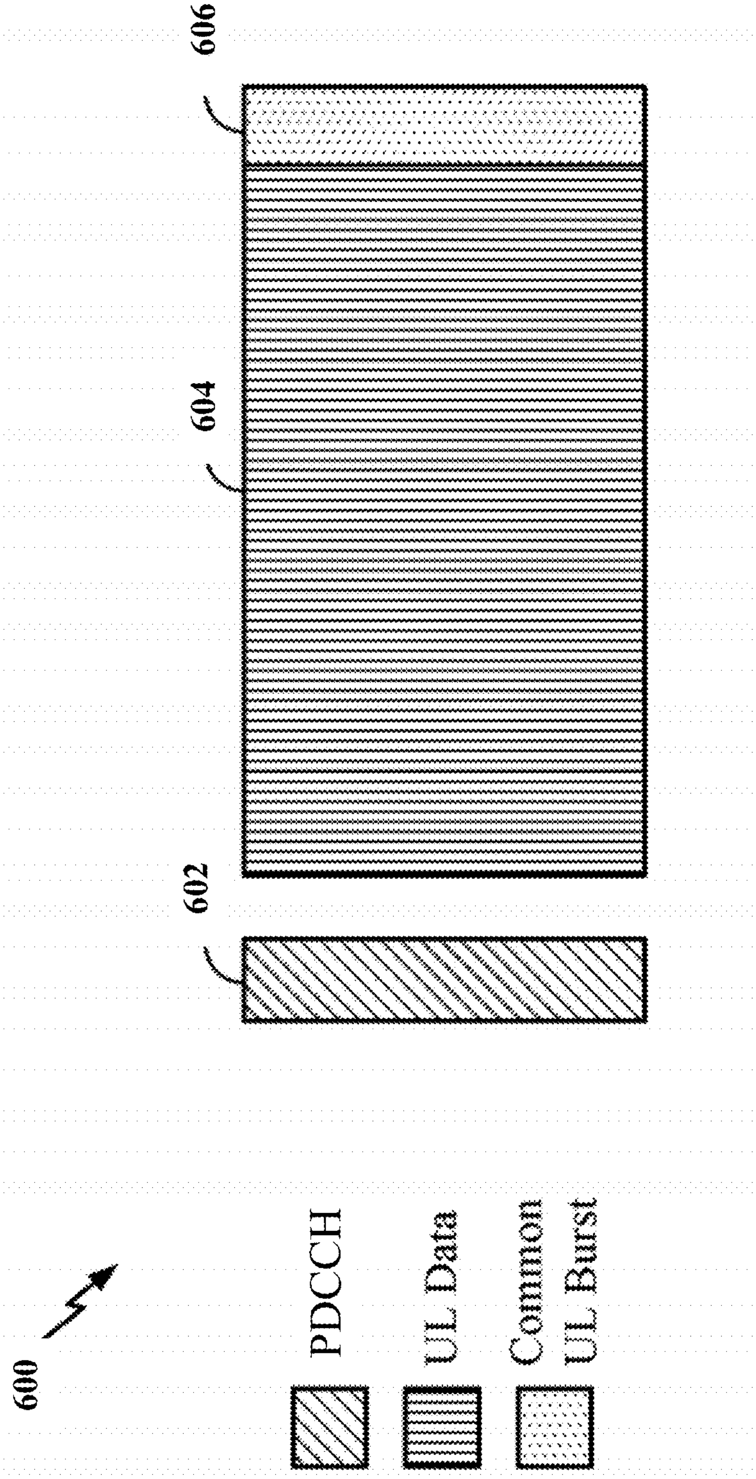
FIG. 6 is a diagram showing an example of an UL-centric slot.

FIG. 6 is a diagram 600 showing an example of an UL-centric slot. The UL-centric slot may include a control portion 602. The control portion 602 may exist in the initial or beginning portion of the UL-centric slot. The control portion 602 in FIG. 6 may be similar to the control portion 502 described above with reference to FIG. 5. The UL-centric slot may also include an UL data portion 604. The UL data portion 604 may sometimes be referred to as the pay load of the UL-centric slot. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric slot may also include a common UL portion 606. The common UL portion 606 in FIG. 6 may be similar to the common UL portion 506 described above with reference to FIG. 5. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric slot and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
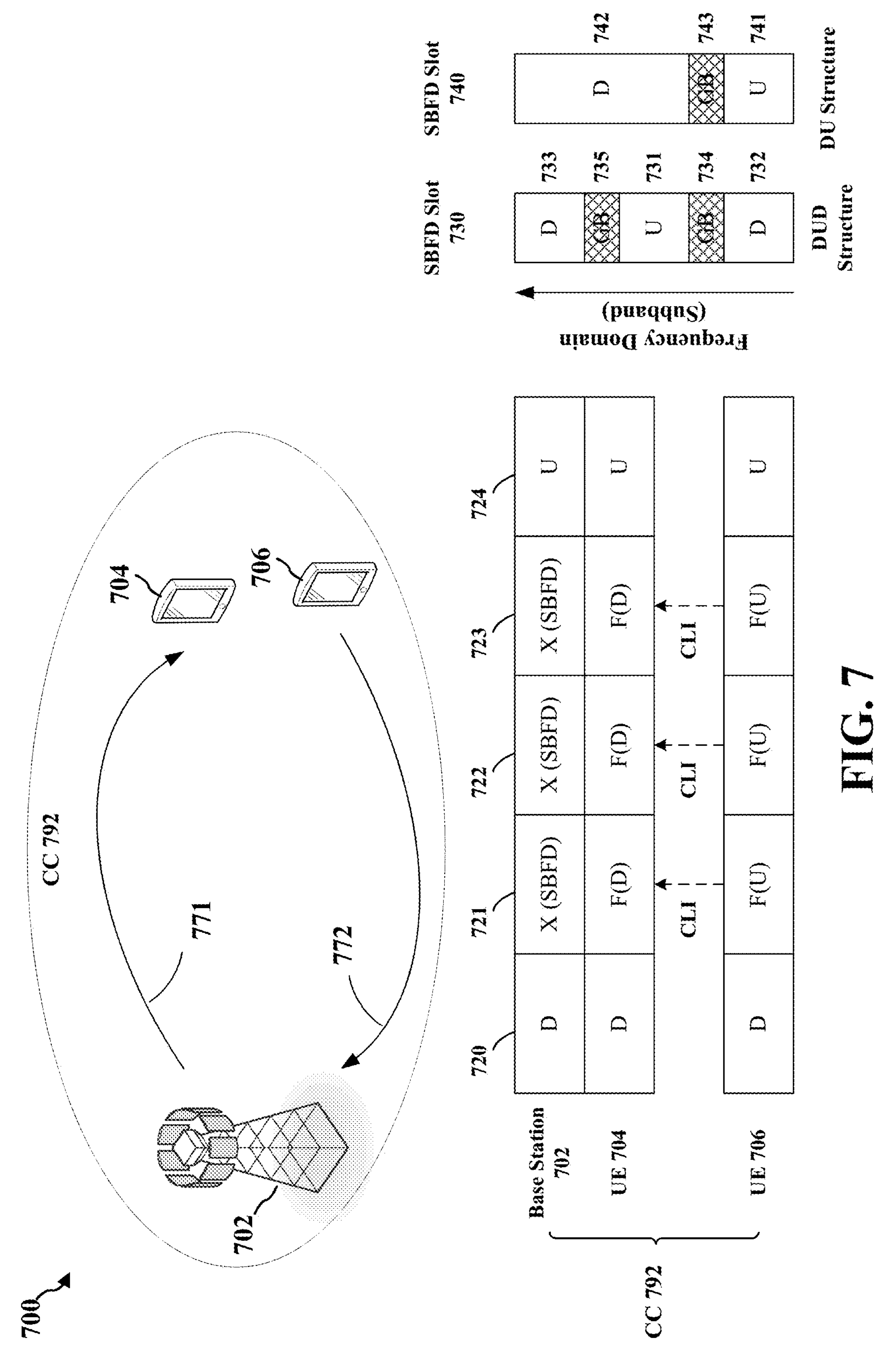
FIG. 7 is a diagram illustrating a communications and transmission timing between a base station and two UEs according to a time division duplexing (TDD) pattern with subband full-duplexing (SBFD) framework structure.

FIG. 7 is a diagram 700 illustrating communications between a base station and two UEs. A base station 702 has established a component carrier (CC) 792 for communications with a UE 704 and a UE 706. The base station 702 uses a time division duplexing (TDD) configuration with at least one SBFD slot to communicate with the UE 704 and the UE 706 on the CC 792. In this example, one such TDD pattern is DXXXU. More specifically, in a downlink-only slot (D), the frequency resources of the slot are available only for the DL transmissions, the base station 702 transmits RF signals to the UE 704 and the UE 706 on the CC 792 through a channel 771. In an uplink-only slot (U), the frequency resources of the slot are available only for the UL transmissions, the UE 704 and the UE 706 transmit RF signals to the base station 702 on the CC 792 through a channel 772. X is a subband full-duplexing (SBFD) slot. In a SBFD slot, the frequency resources of the slot are shared for both the DL and UL transmissions. The base station 702 both transmits and receives RF signals in the SBFD slot. DL subband and UL subband are not overlapped. Guardband (GB) provides isolation between the DL subband and UL subband.

A SBFD slot may have different structures. For example, in certain configurations, a SBFD slot may have a DUD structure, which is indicated by a SBFD slot 730. The SBFD slot 730 includes one uplink (UL) subband 731 at the center of the channel bandwidth, two downlink (DL) subbands 732 and 733 at two sides of the channel bandwidth, a GB 734 between the DL subband 732 and the UL subband 731 and another GB 735 between the DL subband 733 and the UL subband 731. In certain configurations, a SBFD Slot may have a DU structure, which is indicated by a SBFD slot 740. The SBFD slot 740 includes one UL subband 741 at the bottom side of the channel bandwidth, one DL subbands 742 at the top side of the channel bandwidth, and a GB 743 between the DL subband 742 and the UL subband 741.

In this example, the SBFD slots 721, 722, and 723 are configured with the DUD structure. In accordance with the TDD pattern DXXXU, at the base station 702's side. DL transmission occurs in the slots 720, SBFD operations occur in 721, 722, and 723, and UL transmission occurs in slot 724. The UEs 704 and 706 may be either SBFD aware or unaware. SBFD aware UEs are UEs that are aware of SBFD operation at the base station and capable of applying SBFD-specific configurations/settings, whereas SBFD unaware UEs are UEs that are not aware of SBFD operation at the base station and do not have capability to apply SBFD specific configurations/settings.

For SBFD aware UEs, the SBFD slots can be configured by the base station in any one of the following configurations: UL, DL, or both. For SBFD unaware UEs, the SBFD slots can be perceived as flexible slots (F). More specifically, these slots can function either as a DL-only slot or as an UL-only slot.

In this instance, as an example, UE 704 is provisioned to be downlink centric, causing the effective TDD pattern to be DDDDU. According to this pattern, at UE 704's side, DL transmission occurs in slots 720, 721, 722, and 723, while UL transmission occurs in slot 724. Conversely, UE 706 is designated as an uplink centric UE, which results in the specific TDD pattern DUUUU at UE 706's side. Under this configuration, DL transmission occurs in slot 720, while UL transmission takes place in slots 721, 722, 723, and 724.

During SBFD slots 721, 722, and 723, the UE 704, which is the DL centric UE, is in receiver mode, obtaining RF signals from the base station 702 on the DL subbands 732 and 733. Concurrently, the UE 706, which is the UL centric UE, transmits RF signals to the base station 702 on the UL subband 731. Notably, the UL subband 731 and the DL subbands 732 and 733 do not overlap and reside within the same component carrier. This simultaneous operation generates inter-UE cross-link interference (CLI) at the UE 704 due to concurrent transmission from UE 706 and adjacent channel leakages. This interference adversely influences the reception quality of UE 704 during the SBFD slots. Consequently, there is a need for measurement and reporting protocols for CLI from the UE 706 to the UE 704 during SBFD slots. The base station 702 requires this CLI data to make informed decisions regarding resource scheduling, aiming to optimize performance and reduce interference.

Figure 8:
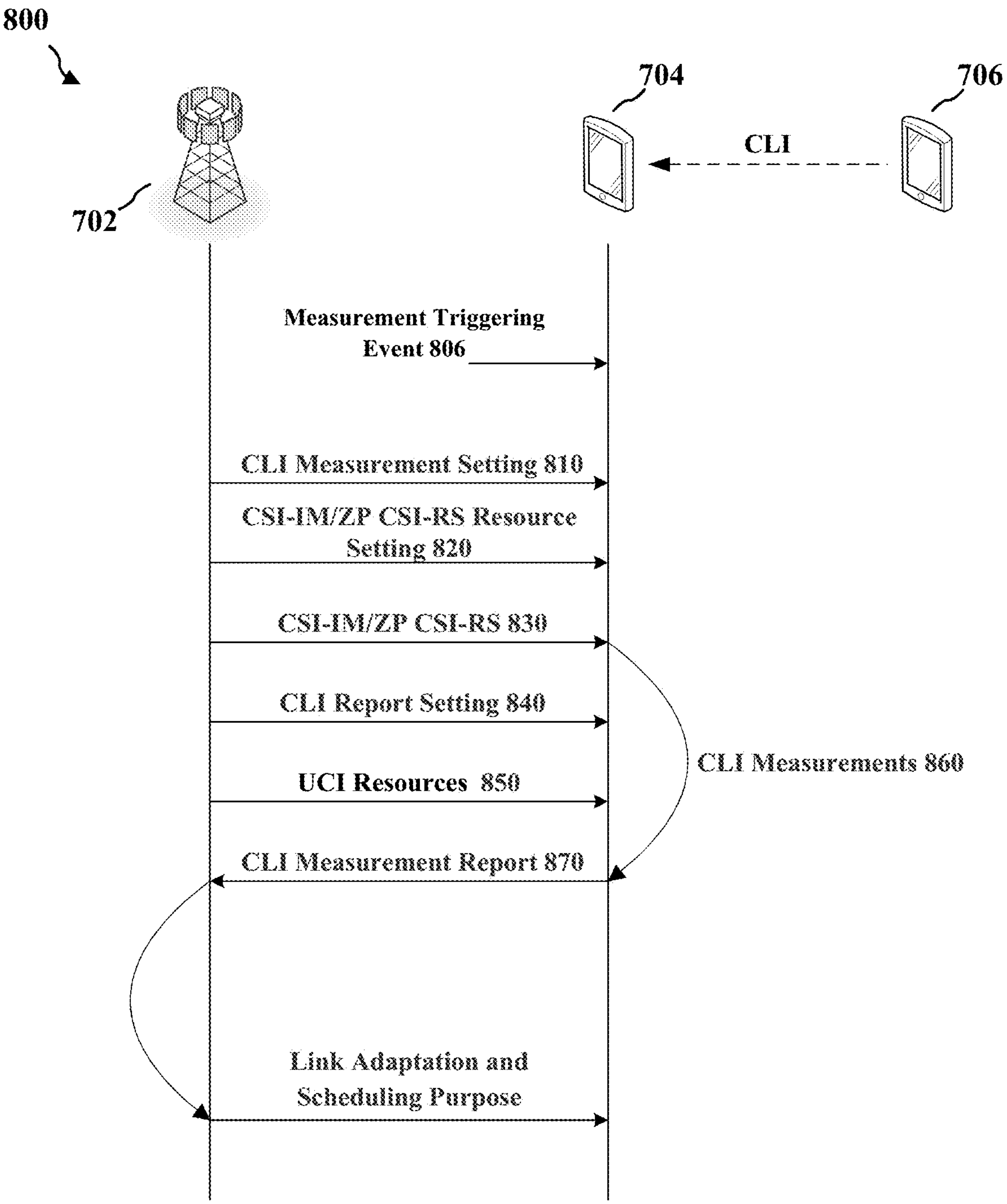
FIG. 8 is a diagram illustrating a first cross-link interference (CLI) measurement and reporting mechanism.

FIG. 8 is a diagram 800 illustrating a first cross-link interference (CLI) measurement and reporting mechanism, which utilizes measurement on channel state information-interference measurement (CSI-IM)/zero-power channel state information reference signal (ZP CSI-RS) resources. CSI-IM resources are specially designated resource elements where no actual data is transmitted from the base station 702. This allows a UE 704 to measure the interference level without the influence of a serving cell's own signal, enabling a more accurate assessment of interference from other sources. Further, ZP CSI-RS resources carry no power from the base station 702, they are devoid of the serving cell's signal. This absence helps the receiving UE isolate the interference from other UEs (inter-UE interference) or from other cells (co-channel interference, CCI) without contamination from its own serving cell's transmissions.

When a measurement triggering event 806 is detected, the base station 702 configures the UE 704 with a CLI measurement setting 810 to enable CLI measurements at the UE 704. The base station 702 may send the CLI measurement setting 810 periodically, in a semi-persistent fashion, or aperiodically. For instance, this triggering event may occur when the number of negative acknowledgements (NACKs) from the UE 704 received by the base station 702 exceeds a predefined threshold N. The CLI measurement setting contains at least one bit of information, where a specific value (e.g., '1') enables, and another value (e.g., '0') disables CLI measurements at the UE 704.

The base station 702 configures the UE 704 with CSI-IM/ZP CSI-RS resource setting 820 for CLI measurements, which vary according to the predetermined CLI measurement configuration at the UE 704. In a first configuration, the CSI-IM/ZP CSI-RS resource setting 820 specifies one CSI-IM/ZP CSI-RS resource configured within the SBFD slot (e.g., slots 721, 722, or 723), which is the slot designated for performing CLI measurements. In a second configuration, the CSI-IM/ZP CSI-RS resource setting 820 specifies two CSI-IM/ZP CSI-RS resources-one being configured in the downlink-only slot preceding the SBFD slot and the other within the SBFD slot itself. The UE 704 is to perform the CLI measurements in the SBFD slot.

The base station 702 transmits CSI-IM/ZP CSI-RS signals 830 to UE 704 over the designated CSI-IM/ZP CSI-RS resources. In addition, base station 702 configures the UE 704 with a CLI report setting 840 as well as UCI resources 850 for CLI reporting purposes.

Upon receipt of the CLI measurement setting 810, UE 704 interprets the included bit(s) and accordingly activates or deactivates its CLI measurement functionality. A bit value of '1' enables CLI measurements, while a '0' denotes that they are disabled.

UE 704 then conducts inter-UE CLI measurements over the provided CSI-IM/ZP CSI-RS resources as delineated in the acquired CSI-IM/ZP CSI-RS resource setting 820. In the first configuration, the UE 704 measures the average received power across resource elements (REs) in the designated CSI-IM/ZP CSI-RS resource in the SBFD slot, designating this average as the CLI. In the second configuration, the UE 704 calculates the average received power over the provided CSI-IM/ZP CSI-RS resources in both the downlink-only slot and the SBFD slot, attributing the difference between these two averages as the CLI. Specifically, denote $I_{SBFD}$ as the average interference encountered in the measurement SBFD slot on the configured resources, which include co-channel interference (CCI), inter-UE CLI, and noise. Denote $I_{DL}$ as the average interference present in the directly preceding downlink-only slot on the same resource, which contains CCI and noise. Consequently, the measured inter-UE CLI is computed as Inter_UE $CLI=I_{SBFD}-I_{DL}$.

This inter-UE CLI measurement can be subjected to various forms of averaging depending on the level (L1, L2, or L3). L1 averaging is the most immediate and basic form of averaging, often referred to as instantaneous CLI. This type of averaging processes the CLI measurements as they are received, without applying any complex filtering or long-term trend analysis. L3 averaging, on the other hand, is a more sophisticated averaging technique that involves layer 3 (RRC—Radio Resource Control) of the network architecture. The RRC layer applies a filter to the CLI measurements to smooth out short-term fluctuations and to provide a more stable and reflective measurement of the interference over time. By averaging CLI measurements across multiple slots, the L3 averaging accounts for changing network conditions and the dynamic nature of interference. L2 is a level of averaging that falls between L1 and L3. L2 averaging may involve more complex processing than L1, such as applying a weighted average or a limited filtering method, but not as complex as the RRC-layer techniques used in L3 averaging.

Using the acquired CLI report setting 840, UE 704 formulates a CLI measurement report 870 and sends the CLI report to the base station 702 through the indicated UCI resources 850.

Upon receiving the CLI measurement reports 870, the base station 702 may determine the timing, the magnitude, and the nature of the interference affecting the UE 704 during SBFD slots. Accordingly, the base station 702 may adjust link adaptation. For example, the base station may adjust various parameters of the physical layer link to the UE 704, such as modulation and coding schemes (MCS), power control, antenna beamforming patterns, and others. By doing so, the base station 702 adjust the link settings to compensate for the measured interference, aiming to maintain or improve the signal quality, data rates, and reliability of the transmissions to and from the UE 704.

Further, the base station 702 may adjust scheduling. For example, the base station 702 can decide when and where to schedule future DL and UL transmissions, both for the reporting UE and others in the network. For instance, it may schedule transmissions to avoid periods or subbands with high interference or allocate resources in a way that minimally impacts the overall network performance.

Figure 9:
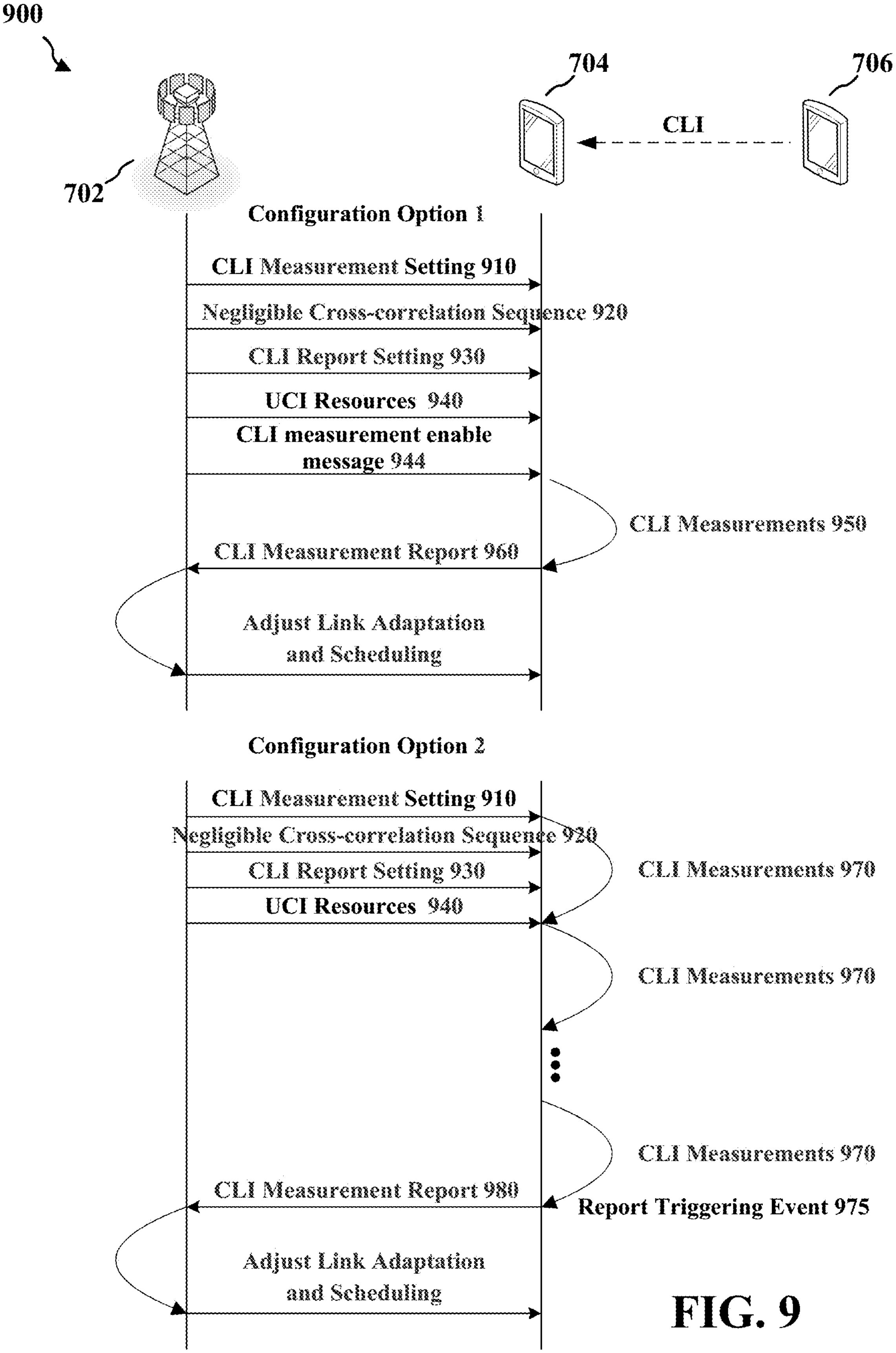
FIG. 9 is a diagram illustrating a second CLI measurement and reporting mechanism.

FIG. 9 is a diagram 900 illustrating a second CLI measurement and reporting mechanism, which focused on measurement over Reference Signal (RS) resources. The base station 702 configures the UE 704 by providing a CLI measurement setting 910. This setting contains an enablement information field that enables one of two possible CLI measurement and reporting enablement configurations. The base station 702 may send the CLI measurement setting 910 periodically, in a semi-persistent fashion, or aperiodically.

In the first enablement configuration, the base station 702 configures CLI measurement at UE 704 by using a CLI measurement enable message 944. More specifically, the base station 702 may determine that it needs to gather CLI measurements from the UE. This need may be triggered by various factors, such as network optimization, interference management, or routine maintenance. The base station 702 sends the measurement enable message 944 to the UE 704, informing the UE 704 to enable or start its measurement procedures. Upon receiving the measurement enable message 944, the UE 704 performs CLI measurements 950 as instructed by the base station 702.

The UE 704 subsequently reports the CLI measurement, which is determined based on the specified reference signal, back to the base station 702. Should the first configuration option be set, the CLI measurement setting 910 includes the reference signal's location for CLI measurement.

In the second enablement configuration, the UE 704 continuously measures CLI based on the reference signal for each received transport block (TB) and reports the measurements to the base station 702 upon the occurrence of a reporting triggering event, such as a packet decoding failure.

Furthermore, the base station 702 configures UE 704 with a negligible cross-correlation sequence x' 920 that has a negligible cross-correlation with the reference signal broadcast by both the serving base station 702 and any neighboring base stations. The reference signal may be any of the DL reference signals (e.g., DMRS, CSI-RS, etc.) transmitted by the base station 702 and the neighboring base stations.

Additionally, the base station 702 configures the UE 704 with a CLI report setting 930 as well as UCI resources 940 for CLI reporting.

Upon receipt of the CLI measurement setting 910 and the negligible cross-correlation sequence x', UE 704 proceeds with measurements over the reference signal resource configured by the CLI measurement setting 910. The CLI measurement setting 910 contains a measurement options information field that indicates a measurement method to be employed.

In a first measurement method, let $x=[x_1, x_2, \ldots, x_D]$ represent the sequences of reference signals transmitted by base station 702, $y=[y_1, y_2, \ldots, y_D]$ represent the sequence of signals received by UE 704, and $x'=[x_1', x_2', \ldots, x_D']$ represent the negligible cross-correlation sequence, where D is the total length of the sequence of reference signals.

The UE 704 then calculates the Inter-UE CLI as $$Inter\text{-}UE\ CLI = \frac{(x')^H y}{\sum_{i=1}^{D} x_i'}.$$

y is the signals received at the UE 704 and contains the reference signals and the CLI. $(x')^H y$ captures the component of y that correlates with the negligible cross-correlation sequence x'. Given that x' is designed to have negligible cross-correlation with the reference signals, $(x')^H y$ primarily measure the interference component including the CLI.

In a special case where the reference signals are the balanced sequences and x'32 [1, 1, . . . , 1] is a sequence of all ones of length D, the Inter-UE CLI is simply calculated as $$Inter\text{-}UE\ CLI = \frac{\sum_{i=1}^{D} y_i}{D}.$$

In a second measurement method, let h denote the channel estimation between the base station 702 and the UE 704. The UE 704 then calculates the measured CLI value as $$|y - hx|^2/D.$$

The UE 704 uses the channel estimate h to reconstruct the expected received signal hx if there was no interference. The UE 704 then takes the difference between the actual received signals y and the expected signals hx, which represents the interference and noise component including the CLI.

As described supra, the inter-UE CLI measurement can be subjected to various forms of averaging depending on the level (L1, L2, or L3).

If UE 704 is configured with the first enablement configuration, the UE 704 generates a CLI measurement report 960 according to the received CLI report setting 930 and transmits the CLI measurement report 960 to the base station 702 via the identified UCI resources 940. If UE 704 is configured with the second enablement configuration, the UE 704 measures the CLI. Upon the occurrence of a reporting triggering event 975, such as a decoding error or an observed high CLI, the UE 704 generates a CLI measurement report 980 in accordance with the acquired CLI report setting 930. Subsequently, the UE 704 transmits this report 980 to the base station 702 on the UCI resources 940.

Upon receiving the CLI measurement report 960 or 980, the base station 702 may adjust link adaptation, scheduling, etc. as described supra.

Figure 10:
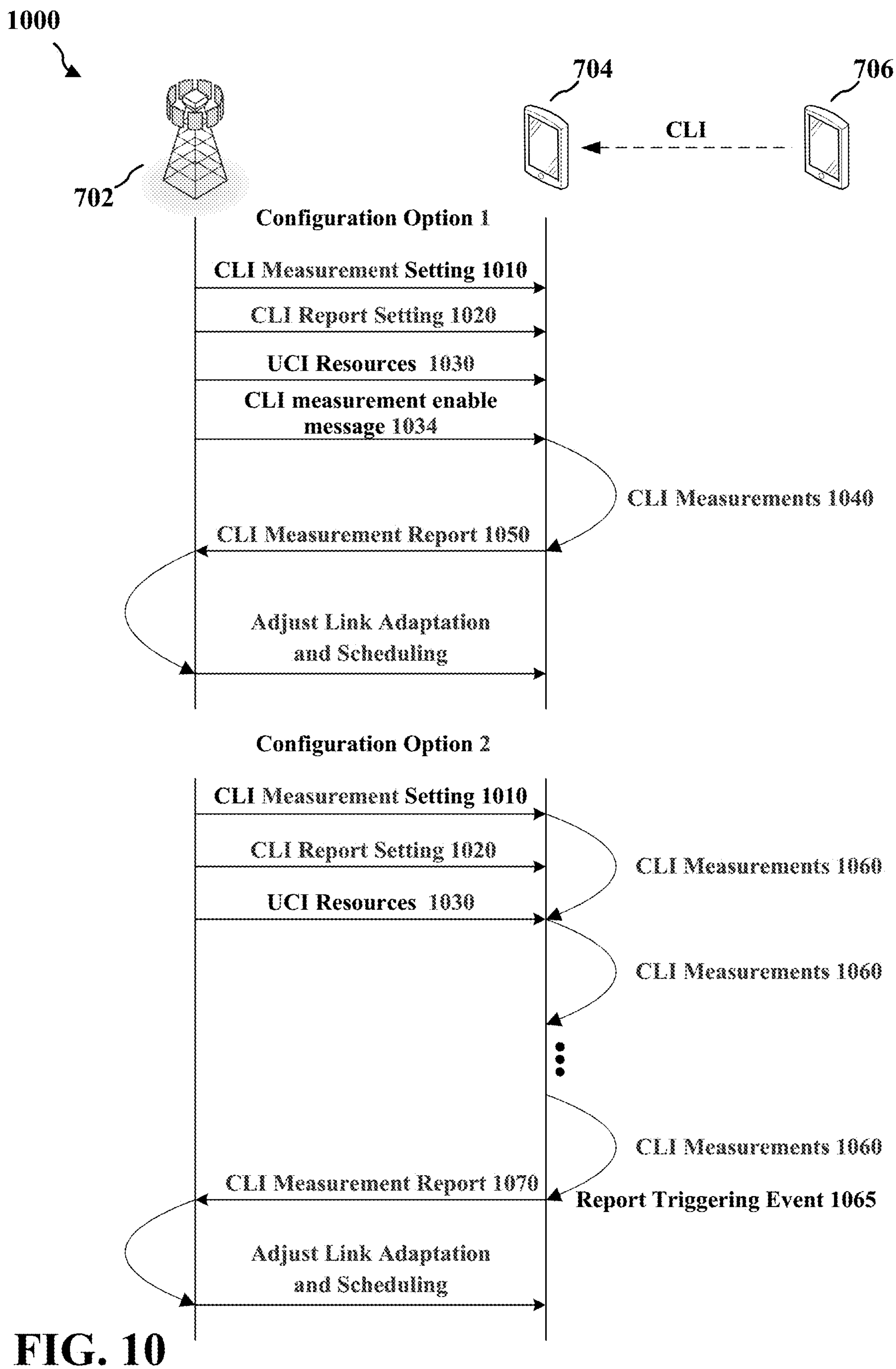
FIG. 10 is a diagram illustrating a third CLI measurement and reporting mechanism.

FIG. 10 is a diagram 1000 illustrating a third CLI measurement and reporting mechanism, which is focused on measurement over guardband (GB) resources. The base station 702 configures the User Equipment (UE) 704 with a CLI measurement setting 1010. The CLI measurement setting 1010 contains an enablement information field to enable one of two CLI measurement and reporting configuration options. The base station 702 may send the CLI measurement setting 1010 periodically, in a semi-persistent fashion, or aperiodically.

In the first enablement configuration option, the base station 702 configures CLI measurement at the UE 704 by using a CLI measurement enable message 1034. More specifically, the base station 702 may determine that it needs to gather CLI measurements from the UE. This need may be triggered by various factors, such as network optimization, interference management, or routine maintenance. The base station 702 sends the measurement enable message 1034 to the UE 704, informing the UE 704 to enable or start its measurement procedures. Upon receiving the measurement enable message 1034, the UE 704 performs CLI measurements 1040 as instructed by the base station 702.

Subsequently, the UE 704 reports CLI measurement measured on the guardband between the Uplink (UL) and Downlink (DL) bandwidth parts (BWP) in Subband Full-Duplexing (SBFD) slots to the base station 702.

In the second configuration option, the UE 704 continuously measures CLI on the guardband between the UL and DL BWPs in SBFD slots for each received transport block (TB) in SBFD slots and reports these measurements to the base station 702 when a reporting triggering event occurs. An example of such a triggering event is a decoding failure of a measurement TB or an observed high CLI.

Moreover, the base station 702 configures the UE 704 with a CLI report setting 1020 as well as UCI resources 1030 for CLI reporting.

Upon receiving the CLI measurement setting 1010, the UE 704 proceeds to measure interference using the specified configuration options. Let $y=[y_1, y_2, \ldots, y_G]$ represent the vector of received signals in the guardband measurement resources. G is the total number of the received signals in the vector and is the number of guardband resources used for the measurement.

The UE 704 calculates the Inter-UE CLI as $$Inter\text{-}UE\ CLI = \frac{|y|^2}{G}.$$

This value indicates an average power value of the received signals in the guardband, which includes CLI. Since the guardband is designed to be a "quiet" space with minimal transmission, a significant measured power in this band would indicate the presence of interference, which could be due to CLI under SBFD conditions. The higher this average power value is, the more significant the interference.

As described supra, the inter-UE CLI measurement can be subjected to various forms of averaging depending on the level (L1, L2, or L3).

If the UE 704 is configured with the first enablement configuration, the UE 704 generates a CLI measurement report 1050 according to the received CLI report setting 1020 and transmits the CLI measurement report 1050 to the base station 702 via the indicated UCI resources 1030. Alternatively, if the UE 704 is configured with the second configuration option, the UE 704 continuously measure CLI. The UE 704 generates the CLI measurement report 1070 according to the received CLI report setting 1020, transmits the CLI measurement report 1070 to the base station 702 on the indicated UCI resources 1030 upon the occurrence of a triggering event 1065, such as a packet decoding failure in a measurement TB or an observed high CLI.

Upon receiving the CLI measurement reports 1050 or 1070, the base station 702 may adjust link adaptation, scheduling, etc. as described supra.

FIG. 11 is a diagram 1100 illustrating report settings that can be used in the first, second, and third CLI measurement and reporting mechanisms described supra. CLI report setting 1100 contains several parameters that guide the UE in structuring the CLI report. These parameters may include, among others, a CLI report type, a CLI threshold, and a CLI report resolution.

The CLI report type parameter specifies the format/content of the CLI report. If this field is set to '1', it indicates that the UE 704 is to report a quantized CLI measurement value with the resolution specified by a CLI report resolution parameter. This multi-bit value indicates a level of the interference, which can be particularly useful for the base station 702 to make refined adjustments in link adaptation and resource scheduling.

The CLI report resolution specifies the number of quantization bits that UE 704 should utilize to report the measured CLI value, represented by Inter-UE CLI. This resolution determines the precision of the reported interference measurement; a higher number of bits correlates with more detailed interference information conveyed to the base station 702.

On the other hand, if the CLI report type is set to '0', the UE 704 is instructed to compare the measured CLI value with a value of the CLI threshold parameter. The UE 704 then reports a binary outcome: '1' to indicate high interference or '0' to indicate low interference. The CLI threshold has a predefined value used by the UE 704 to determine whether the level of interference falls above (high) or below (low) this threshold. The binary report reduces the complexity of the report and may be suitable in scenarios where the base station 702 requires a simpler and more rapid assessment of the interference situation.

The report setting for CLI measurement equips the UE 704 with the necessary instructions to measure, quantify, and report the level of interference it encounters. This includes specifying the granularity of the report and the method of indicating the presence of interference to the base station 702. Thus, the base station can leverage this information to make informed decisions about link adaptation, scheduling, and resource allocation.

Figure 12:
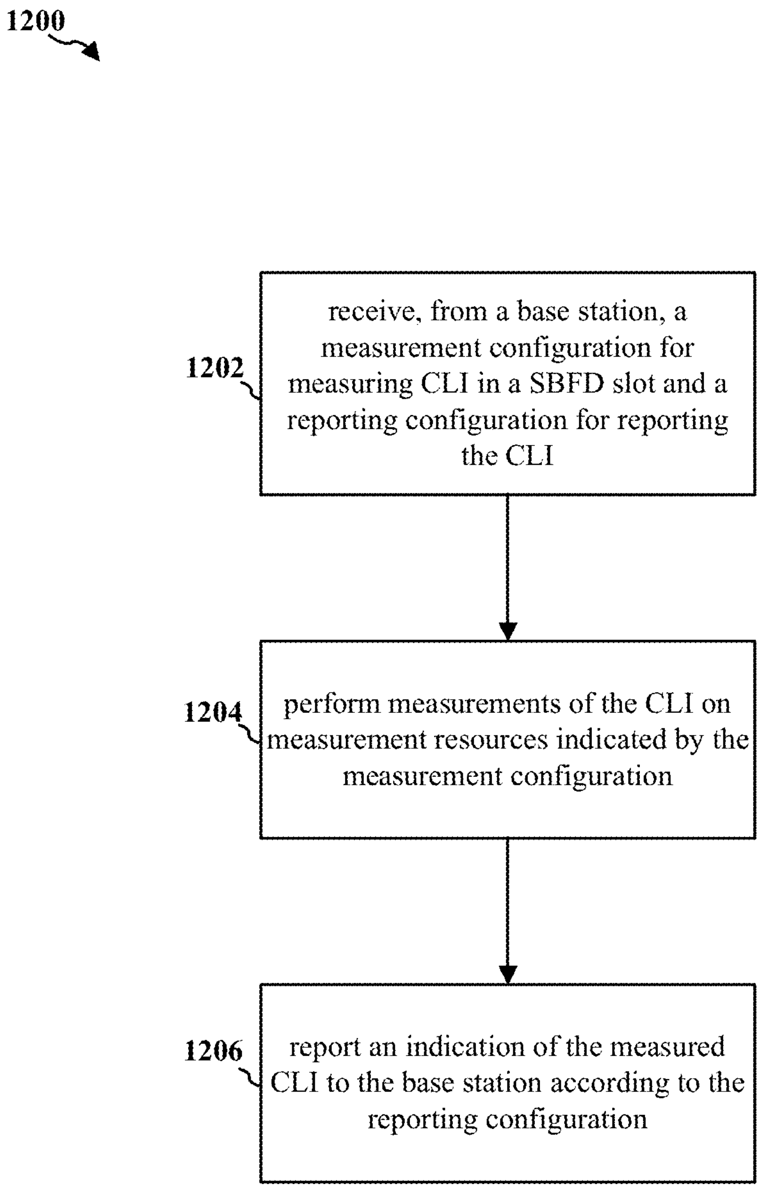
FIG. 12 is a flow chart of a method (process) for calculating and reporting CLI.

FIG. 12 is a flow chart 1200 illustrating a method (process) for calculating and reporting CLI. The method may be performed by a UE (e.g., the UE 704, the UE 250). In operation 1202, the UE receives, from a base station, a measurement configuration for measuring cross-link interference (CLI) in a subband full-duplexing (SBFD) slot and a reporting configuration for reporting the CLI. In operation 1204, the UE performs measurements of the CLI on measurement resources indicated by the measurement configuration.

In certain configurations, the measurement resources may comprise at least one of a channel state information-interference measurement (CSI-IM) resource and a zero-power channel state information reference signal (ZP CSI-RS) resource. In one approach, the measurement resources are configured in the SBFD slot and a downlink slot preceding the SBFD slot. To perform measurements of the CLI, the UE measures a first average received power on the CSI-IM resource or the ZP CSI-RS resource in the downlink slot. The UE measures a second average received power on the CSI-IM resource or the ZP CSI-RS resource in the SBFD slot. The UE determines the CLI based on a difference between the second average received power and the first average received power.

In another approach, the CSI-IM resource or the ZP CSI-RS resource is configured in the SBFD slot. To perform measurements of the CLI, the UE measures an average received power of signals received on the CSI-IM resource or the ZP CSI-RS resource in the SBFD slot. The UE determines the CLI based on the measured average received power.

In certain configurations, the measurement resources include a reference signal resource configured in the SBFD slot. In one approach, the measurement configuration further specifies a negligible cross-correlation sequence having negligible cross-correlation with a reference signal sequence transmitted on the reference signal resource in the SBFD slot by a serving base station or one or more neighboring base stations. The UE further receives a sequence of signals on the reference signal resource in the SBFD slot. The UE determines the CLI based on a correlation of the specified negligible cross-correlation sequence with the received sequence of signals. In certain configurations, the reference signal sequence transmitted by the base station comprises at least one of a demodulation reference signal (DMRS) and a channel state information reference signal (CSI-RS).

In another approach, the UE obtains a channel estimation between the base station and the UE. The UE determines an expected received signal sequence based on the channel estimation and the reference signal sequence transmitted by the base station. The UE determines the CLI based on a difference between the received sequence of signals and the expected received signal sequence.

In certain configurations, the measurement resources include guard band resources between uplink resources and downlink resources in the SBFD slot. To perform measurements of the CLI, the UE measures an average received power based on signals received in the guard band resources in the SBFD slot. The UE determines the CLI based on the measured average received power.

In operation 1206, the UE reports an indication of the measured CLI to the base station according to the reporting configuration. In certain configurations, the reporting configuration indicates at least one of: a number of bits to quantize the measured CLI into a quantized CLI report, a CLI threshold to compare the measured CLI against to determine a binary CLI report, and a CLI reporting type indicating one of the quantized CLI report and the binary CLI report. The UE further formats the CLI report based on the indicated CLI reporting type in the reporting configuration received from the base station. The CLI report include one of the quantized CLI report based on the number of bits configured for quantization and the binary CLI report indicating whether the measured CLI is greater than or less than the CLI threshold.

In certain configurations, the measurement configuration and reporting configuration are received via at least one of: a radio resource control (RRC) message, a medium access control (MAC) control element (CE), and a downlink control information (DCI) message. In certain configurations, the measured CLI is reported via at least one of a Physical Uplink Control Channel (PUCCH), a Physical Uplink Shared Channel (PUSCH), a medium access control (MAC) control element (CE), and a radio resource control (RRC) message.

In certain configurations, prior to the performing of measurements of the CLI, the UE obtains, from the measurement configuration, an enablement indication to enable or disable the performing of measurements of the CLI. The UE determines to enable the performing of measurements of the CLI based on the obtained enablement indication.

In certain configurations, subsequent to the performing of measurements of the CLI and prior to the reporting of the measured CLI, the UE determines that a trigger event for reporting the measured CLI has occurred. The CLI is reported in response to the determination of the occurrence of the trigger event. The trigger event may be a failure in decoding a transport block transmitted from the base station. The trigger event may be a measured CLI value being greater than a predetermined threshold.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean “one and only one” unless specifically so stated, but rather “one or more.” The word “exemplary” is used herein to mean “serving as an example, instance, or illustration.” Any aspect described herein as “exemplary” is not necessarily to be construed as preferred or advantageous over other aspects. Unless specifically stated otherwise, the term “some” refers to one or more. Combinations such as “at least one of A, B, or C,” “one or more of A, B, or C,” “at least one of A, B, and C,” “one or more of A, B, and C,” and “A, B, C, or any combination thereof” include any combination of A, B, and/or C, and may include multiples of A, multiples of B, or multiples of C. Specifically, combinations such as “at least one of A, B, or C,” “one or more of A, B, or C.” “at least one of A, B, and C,” “one or more of A, B, and C,” and “A, B, C, or any combination thereof” may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words “module,” “mechanism,” “element,” “device,” and the like may not be a substitute for the word “means.” As such, no claim element is to be construed as a means plus function unless the element is expressly recited using the phrase “means for.”

What is claimed is:

1. A method of wireless communication of a user equipment (UE), comprising:

receiving, from a base station, a measurement configuration for measuring cross-link interference (CLI) in a subband full-duplexing (SBFD) slot having an uplink subband and a downlink subband that do not overlap and that reside within a same component carrier, the uplink subband and the downlink subband being separated by a guardband, wherein frequency resources of the SBFD slot are shared for both downlink transmissions and uplink transmissions, and a reporting configuration for reporting the CLI;

performing measurements of the CLI on measurement resources indicated by the measurement configuration, wherein the measurement configuration specifies a cross-correlation sequence, the measurement resources comprise a reference signal resource configured in the SBFD slot, and the performing measurements comprises:

receiving a sequence of signals on the reference signal resource in the SBFD slot; and determining the CLI based on a correlation of the specified cross-correlation sequence with the received sequence of signals or a difference between the received sequence of signals and an expected received signal sequence; and reporting an indication of the measured CLI to the base station according to the reporting configuration.

2. The method of claim 1, wherein the measurement resources further comprise at least one of a channel state information-interference measurement (CSI-IM) resource and a zero-power channel state information reference signal (ZP CSI-RS) resource.

3. The method of claim 2, wherein the measurement resources are configured in the SBFD slot and a downlink slot preceding the SBFD slot, wherein the performing measurements comprises:

measuring a first average received power on the CSI-IM resource or the ZP CSI-RS resource in the downlink slot;

measuring a second average received power on the CSI-IM resource or the ZP CSI-RS resource in the SBFD slot; and determining the CLI based on a difference between the second average received power and the first average received power.

4. The method of claim 2, wherein the CSI-IM resource or the ZP CSI-RS resource is configured in the SBFD slot, wherein the performing measurements comprises:

measuring an average received power of signals received on the CSI-IM resource or the ZP CSI-RS resource in the SBFD slot; and determining the CLI based on the measured average received power.

5. The method of claim 1, wherein the specified cross-correlation sequence has a cross-correlation with a reference signal sequence transmitted on the reference signal resource in the SBFD slot by a serving base station or one or more neighboring base stations, and wherein the correlation of the specified cross-correlation sequence with the received sequence of signals primarily measures an interference component comprising the CLI.

6. The method of claim 5, wherein the reference signal sequence transmitted by the base station comprises at least one of a demodulation reference signal (DMRS) and a channel state information reference signal (CSI-RS).

7. The method of claim 1, wherein determining the CLI based on the difference between the received sequence of signals and the expected received signal sequence comprises:

obtaining a channel estimation between the base station and the UE; and determining the expected received signal sequence based on the channel estimation and a reference signal sequence transmitted by the base station.

8. The method of claim 1, wherein the measurement resources further comprise guard band resources between uplink resources and downlink resources in the SBFD slot, and wherein performing measurements comprises:

measuring an average received power based on signals received in the guard band resources in the SBFD slot; and determining the CLI based on the measured average received power.

9. The method of claim 1, wherein the reporting configuration indicates at least one of:

a number of bits to quantize the measured CLI into a quantized CLI report, a CLI threshold to compare the measured CLI against to determine a binary CLI report, and a CLI reporting type indicating one of the quantized CLI report and the binary CLI report.

10. The method of claim 9, further comprising:

formatting the CLI report based on the indicated CLI reporting type in the reporting configuration received from the base station, wherein the CLI report comprises one of: the quantized CLI report based on the number of bits configured for quantization and the binary CLI report indicating whether the measured CLI is greater than or less than the CLI threshold.

11. The method of claim 1, wherein the measurement configuration and reporting configuration are received via at least one of: a radio resource control (RRC) message, a medium access control (MAC) control element (CE), and a downlink control information (DCI) message.

12. The method of claim 1, wherein the measured CLI is reported via at least one of a Physical Uplink Control Channel (PUCCH), a Physical Uplink Shared Channel (PUSCH), a medium access control (MAC) control element (CE), and a radio resource control (RRC) message.

13. The method of claim 1, further comprising, prior to the performing of measurements of the CLI:

obtaining, from the measurement configuration, an enablement indication to enable or disable the performing of measurements of the CLI; and determining to enable the performing of measurements of the CLI based on the obtained enablement indication.

14. The method of claim 1, further comprising, subsequent to the performing of measurements of the CLI and prior to the reporting of the measured CLI:

determining that a trigger event for reporting the measured CLI has occurred, wherein the CLI is reported in response to the determination of the occurrence of the trigger event.

15. The method of claim 14, wherein the trigger event is a failure in decoding a transport block transmitted from the base station.

16. The method of claim 14, wherein the trigger event is a measured CLI value being greater than a predetermined threshold.

17. An apparatus for wireless communication, the apparatus being a user equipment (UE), comprising:

a memory; and at least one processor coupled to the memory and configured to:

receive, from a base station, a measurement configuration for measuring cross-link interference (CLI) in a subband full-duplexing (SBFD) slot having an uplink subband and a downlink subband that do not overlap and that reside within a same component carrier, the uplink subband and the downlink subband being separated by a guardband, wherein frequency resources of the SBFD slot are shared for both downlink transmissions and uplink transmissions, and a reporting configuration for reporting the CLI;

perform measurements of the CLI on measurement resources indicated by the measurement configuration, wherein the measurement configuration specifies a cross-correlation sequence, the measurement resources comprise a reference signal resource configured in the SBFD slot, and to perform the measurements, the at least one processor is configured to:

receive a sequence of signals on the reference signal resource in the SBFD slot; and determine the CLI based on a correlation of the specified cross-correlation sequence with the received sequence of signals or a difference between the received sequence of signals and an expected received signal sequence; and report an indication of the measured CLI to the base station according to the reporting configuration.

18. The apparatus of claim 17, wherein the measurement resources further comprise at least one of a channel state information-interference measurement (CSI-IM) resource and a zero-power channel state information reference signal (ZP CSI-RS) resource.

19. A non-transitory computer-readable medium storing computer executable code for wireless communication of a user equipment (UE), comprising code to:

receive, from a base station, a measurement configuration for measuring cross-link interference (CLI) in a subband full-duplexing (SBFD) slot having an uplink subband and a downlink subband that do not overlap and that reside within a same component carrier, the uplink subband and the downlink subband being separated by a guardband, wherein frequency resources of the SBFD slot are shared for both downlink transmissions and uplink transmissions, and a reporting configuration for reporting the CLI;

perform measurements of the CLI on measurement resources indicated by the measurement configuration, wherein the measurement configuration specifies a cross-correlation sequence, the measurement resources comprise a reference signal resource configured in the SBFD slot, and the code to perform the measurements comprises code to:

receive a sequence of signals on the reference signal resource in the SBFD slot; and determine the CLI based on a correlation of the specified cross-correlation sequence with the received sequence of signals or a difference between the received sequence of signals and an expected received signal sequence; and report an indication of the measured CLI to the base station according to the reporting configuration.

* * * * *